Sept. 10, 1940.  E. J. DILLMAN  2,214,272

FUEL SUPPLY CONTROL MEANS

Filed Jan. 24, 1939

INVENTOR
Earnest J. Dillman
BY
Andrew K. Foulds
his ATTORNEY

Patented Sept. 10, 1940

2,214,272

UNITED STATES PATENT OFFICE 2,214,272

FUEL SUPPLY CONTROL MEANS

Earnest J. Dillman, Detroit, Mich., assignor to Detroit Lubricator Company, Detroit, Mich., a corporation of Michigan Application January 24, 1939, Serial No. 252,632

9 Claims. (Cl. 277—20)

My invention relates generally to heating systems and more particularly to fuel supply control means therefor.

One of the objects of my invention is to provide a new and improved fuel supply control system of the type having a thermostatic valve for controlling flow of fuel to a main burner, or burners, and to provide a control system for this purpose in which the temperature of the thermostatic element is controlled by the thermostatic valve so that after the thermostatic valve has been opened, the thermostatic element will not be heated to temperatures in excess of that necessary to maintain the thermostatic valve in open position.

Another object of my invention is to provide a new and improved fuel supply control system of the above mentioned character in which the temperature of the heating means is controlled in such a manner as to obtain quick operation in the opening and closing of the thermostatic valve.

Another object of my invention is to provide a new and improved thermostatically operated valve which has a quick opening or closing action without the use of snap-acting or other and similar mechanisms designed to obtain a quick movement of the parts.

The invention consists in the improved construction and combination of parts, to be more fully described hereinafter and the novelty of which will be particularly pointed out and distinctly claimed.

In the accompanying drawing, to be taken as a part of this specification, I have fully and clearly illustrated my invention, in which drawing—

Fig. 3 is an enlarged detail view shown in cross-section of a valve and cooperative structure which is employed in the device shown in Fig. 2;

Fig. 5 is a detail view in section of another form of main and pilot valves embodying my invention.

Figure 1:
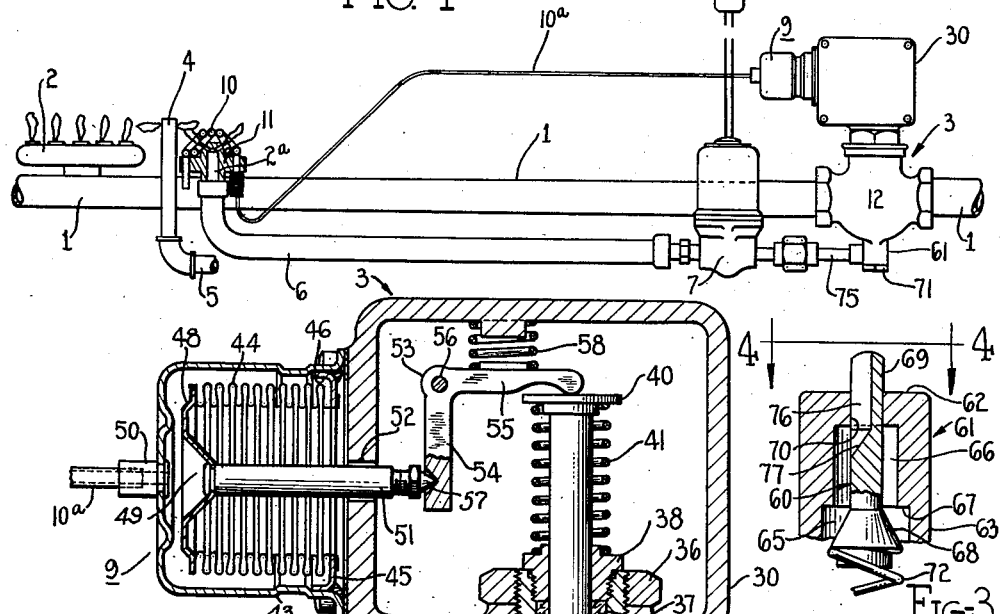
Figure 1 is a diagrammatic view of a fuel supply control system embodying my invention.

In Fig. 1 of the drawing there is shown a fuel supply control system which, in the present instance, is adapted for use with a gas burning type of heating system including a gas supply line or pipe in which there may be one or more main gas burners or heaters, as indicated at 2, the pipe 1 being connected to the usual source of gas supply. The fuel supply control system includes means for controlling the supply of fuel to the main burner 2 and has a heater or auxiliary pilot burner 2ª. In the gas supply line 1, between the source of supply and the main burner 2, there is a thermostatically operated control device or valve mechanism 3 which is operable to control flow of gas to the main burner 2 in response to variation in the heat supplied by the auxiliary burner 2ª. The main burner 2 has its flame controlled in accordance with the demand for heat from a boiler, room, or other enclosed space to be heated, the burner being lighted by a constantly or continuously burning pilot light or burner 4 when the thermostatically operated valve is in open position permitting flow of gas to the main burner 2. The constantly burning pilot 4 may be located adjacent to, and at one side of the main burner 2, as shown, and gas may be supplied thereto through a supply line or pipe 5 which is connected to the source of gas supply. The auxiliary burner 2ª is supplied with gas by means of a pipe or conduit 6 which is communicatively connected to the gas supply inlet chamber in the casing of the control device 3. In the supply line 6, between the auxiliary burner 2ª and the thermostatically operated control device 3, there is a control device or valve 7 for controlling flow of fuel to the auxiliary burner 2ª. The control device 7 is preferably a solenoid operated valve or any other type of valve which may be remotely operated. Controlling the operation of the solenoid valve 7 and electrically connected thereto, there is a thermostat 8 which may be located so as to be responsive to the temperature of a boiler, room, or other space to be heated. The solenoid valve 7, under control of the thermostat 8, opens or closes the fuel supply line 6 to the auxiliary burner 2ª so that the auxiliary burner is supplied with fuel in accordance with the temperature of the thermostat.

The control device 3 is actuated by temperature responsive means 9 which includes a bulb element 10 connected by a capillary tubing or conduit 10ª to the expansible power element chamber of the means 9, the element, tubing and chamber containing a suitable expansible-contractible fluid such as aniline. Surrounding the tip of and carried by the auxiliary burner 2ª there is a supporting member 11 for supporting the bulb element 10 which is preferably of coiled form and positioned in partial overlying relation to and around the burner so that a bulb element of large capacity may be used and have good heat transfer relation with the burner flame.

Figure 2:
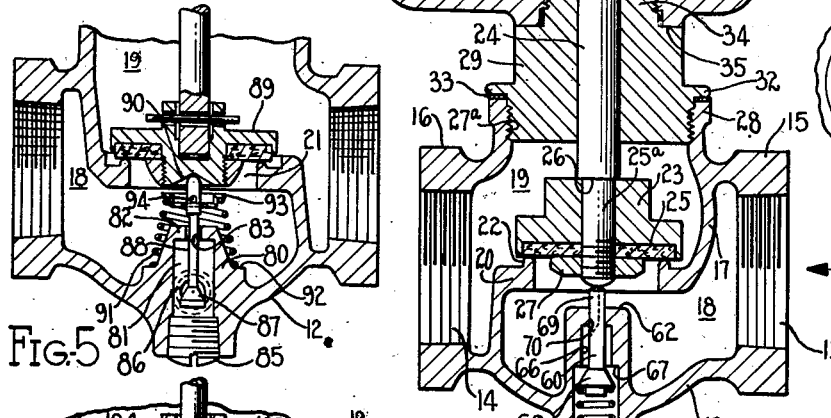
Fig. 2 is a view shown in vertical cross-section of a thermostatically operated control device employed in the system and embodying features of my invention.

Referring now to the thermostatically operated control device 3 of which one form is shown in detail in Fig. 2, this device includes a hollow casing or valve body 12 which may be of the globe valve type having an inlet 13 and an outlet 14, defined by horizontally and externally extending hollow bosses 15 and 16 respectively. The bosses 15 and 16 may be oppositely disposed and are internally threaded for connection in the main gas supply line or pipe 1. A partition member or wall 17 separates the inlet 13 from the outlet 14 dividing the interior of the hollow body 12 into two chambers or compartments 18 and 19, which chambers may be termed the inlet and outlet chambers respectively. The partition or wall 17 has a horizontally extending portion 20 which is preferably located centrally within the hollow body 12 and which is provided with a vertical aperture 21 therethrough which constitutes the valve port.

The upper face of the horizontal wall portion 20 is preferably provided with an upstanding annular rib or bead 22 entirely surrounding the valve port 21 to provide a valve seat. Flow of gas through valve port 21 to the main burner 2 is controlled by a valve member which includes a valve head 23 having a valve stem 24 rigid therewith and extending upwardly therefrom. The valve head 23 is preferably located for reciprocal movement in the outlet chamber 19 and has its underface recessed to receive a compressible washer or seating member 25 for engaging with the valve seat 22. In the present instance, the valve head 23 and the valve stem 24 are separate parts, the valve head being provided with an aperture centrally therethrough for receiving the lower end portion 25ª of the valve stem, which portion is of reduced diameter to provide a downwardly facing annular shoulder 26 against which the valve head seats. The reduced portion 25ª extends through the valve head and is externally threaded for receiving a nut 27 by which the washer 25 is fixed to the valve head and the valve head is tightly clamped against the annular shoulder 26 and to the valve stem 24.

The valve casing 12 has an opening 27ª in its upper end concentric with port 21 and through which the valve stem 24 extends to the exterior of the casing 12, the opening being defined by an upwardly extending hollow boss 28. The opening 27ª receives a bonnet or upwardly extending closure member 29 which supports a mechanism casing 30 on its upper end and thus serves as a connecting member or extension between the valve casing 12 and the mechanism casing 30. The connecting member or bonnet 29 is screw-threaded into the opening 27ª and has an external annular flange 32 which seats on the boss 28, a gasket 33 being provided to prevent the escape of gas through the joint. The bonnet 29 has a vertically extending central bore through which the valve stem 24 extends and is guided for reciprocal movement.

The upper end portion of the connecting member or bonnet 29 may be reduced in diameter, as at 34, to receive the apertured bottom wall of the casing 30 and to provide an upwardly facing shoulder 35 on which the casing 30 may seat. The casing 30 is secured to the bonnet 29 by screw-threaded engagement and by a locking nut 36 which is threaded onto the reduced portion 34 to clamp the mechanism casing to the shoulder 35. In the upper end of the reduced portion 34 there is a packing material receiving recess 37, surrounding the valve stem 24 and having a packing gland or nut 38. The valve stem 24 projects into casing 30 and terminates at its upper end in an external annular flange or shoulder 40. Surrounding the valve stem within casing 30 there is a helical coil spring 41 with one end bearing against the packing nut 38 and the other end bearing against the valve stem flange 40. The spring 41 is under compression so that it is tending or normally acting to move the valve member upwardly or in a valve opening direction to open the port 21. The flange 40 and the packing nut 38 may be provided with annular bosses for locating and positioning the ends of spring 41.

The temperature responsive means 9 which serves as the valve actuator is mounted externally on a vertical wall of the casing 30 and includes a cup-like housing or casing 43 which has an open end facing the interior of the casing 30. At the open end of casing 43 is an outward or laterally extending apertured flange to receive screws for securing the casing 43 to the casing 30. Within the casing 43 there is a pressure responsive power element 44 including a metal bellows element having one end secured and sealed, as by solder, to an annular member or ring 45 having a circumferential flange 46 which fits tightly within the housing 43 and is secured and sealed, as by solder, to the housing wall. The other, or free end of the bellows element 44 is secured and hermetically sealed, as by solder, to an end wall or plate member 48 which is movable upon and by expansion or contraction of the bellows. The bellows element 44, member 48 and ring 45 cooperate with the casing 43 to provide a pressure chamber 49 in which the expansible-contractible fluid acts on the bellows member in accordance with the temperature to which the fluid is heated by the auxiliary burner 2ª. The pressure conveying tube 10ª is connected and sealed to the casing 43, in communication with the pressure chamber 49, by means of a tubular fitting or nipple 50.

Carried by the movable bellows end wall 48 there is a thrust member or push rod 51 which extends centrally through the bellows and through an aperture 52 in the wall of casing 30 and projects into casing 30. The push rod 51 is sealed and secured in an aperture in the end wall 48 so that the chamber 49 is hermetically sealed. Within the casing 30 there is a lever 53 for transmitting movement of the thrust member 51 to the valve stem, the lever preferably being of the bell crank type having arms 54 and 55 extending vertically and horizontally respectively from the pivot point or fulcrum. The lever 53 is pivotally supported on a shaft or pin 56 supported at its ends in the front and rear walls of the casing 30 and transverse to rod 51. The downward extending lever arm 54 has a conical recess facing toward and alined with the rod 51 to receive the pointed or conical end portion 57 thereof. The other lever arm 55 has its free end seating on or bearing against the upper end of the valve stem, the lever end preferably being rounded, as shown, to minimize friction and to give clearance between the parts. A helical coil spring 58 normally acting to seat the valve member is positioned between lever arm 55 and the casing top wall. The spring 58 is stronger or exerts a greater force on the valve member than opposing spring 41 so that the valve member is normally urged to closed position. The lever arm 55 and the top wall of casing 30 have alined bosses for receiving and retaining the ends of spring 58 in proper position.

In order to provide a fuel supply control system in which a thermostatic valve has a quick opening and closing action without the necessity of snap-acting or similar mechanism, I provide for controlling the supplying of fuel to the auxiliary burner 2ª in accordance with the position of the thermostatic actuated valve member 23. To this end, I provide a pilot burner metering valve member 60 disposed in the lower end of the valve casing 12 and actuated by movement of the thermostatic valve member for controlling flow of fuel from inlet chamber 18 to the auxiliary burner 2ª. The casing 12 has a partition member or wall 61, preferably tubular in form, having an end wall 62 and formed integral with the bottom wall of the casing. The partition member 61 is located immediately below the lower end of the valve stem in axial alinement with the stem and the port 21. The member 61 has end portions 63 and 64 which extend from opposite sides of the bottom wall of the casing 12, with portion 63 extending into inlet chamber 18 to a point adjacent the horizontal wall 20 in which the valve port 21 is located. The member 61 which is hollow provides a valve chamber or end compartment 65 on the opposite side of the intermediate inlet compartment 18 from the main valve chamber 19. At the upper end of chamber 65 there is a chamber portion 66 of reduced cross-sectional area providing a downward facing annular shoulder, the inner circumferential edge 67 of which provides a valve seat for cooperation with the conical shaped valve head 68 of the metering valve member 60. The valve member 60 has an upwardly extending stem 69 which is reciprocally guided through and slidably fits in an aperture 70 through the partition end wall 62. The stem 69 extends through or across the chamber 18 and has its end terminating in abutting engagement with the lower end of valve member 23 and preferably in alined engagement with the stem 24. The other or lower end of chamber 65 is open, the opening being threaded to receive a closure plug 71, the joint being provided with a sealing gasket to prevent the escape of gas from chamber 65. A helical coil spring 72 is positioned in the chamber 65 with one end engaging and seating on the inner end of closure plug 71 and the other end engaging the valve head 68. The spring 72 is under compression but exerts only sufficient force to maintain the abutting engagement or loose connection between the stem 69 and valve member 23 as the member 23 moves toward open position. The external partition portion 64 has a lateral tubular projection or boss 73 above the plug 71 and having a passageway 74 therethrough opening into the chamber 65. The passageway 74 is threaded to receive a pipe or conduit 75 having its other end connected to the inlet port of the solenoid valve 7.

Figure 4:
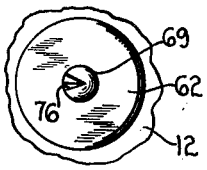
Fig. 4 is a detail view taken in the direction of the arrows 4—4 of Fig. 3.

The valve member 60, see Figs. 3 and 4, has its stem 69 provided with a meter ring slot, or longitudinal recess 76 in its side wall and V-shaped in transverse cross-section. The slot 76 leads out of the upper end of the valve stem and is preferably of uniform depth or cross-section to a point intermediate its ends and below end wall 62 where its base extends at an angle to the stem, as at 77, and leads out of the side wall of the stem so that the slot tapers or is of uniformly decreasing depth at its lower end which when valve member 23 is closed is within chamber 65.

Thus, the wall of the stem defining the slot or recess 76, 77 cooperates with the inner wall of the aperture or bore 70 to define a passageway for gas, the flow capacity of the passageway being variable upon movement of the valve member 60 in accordance with the extent to which the portion 77 of the slot is moved into the wall 62 or aperture 70. When the thermostatic valve is seated, as shown, the valve member 60 is held thereby in an open position so that a maximum flow of fuel will be permitted to flow to the auxiliary burner 2ª upon opening of valve 7, to produce a correspondingly high flame and temperature of the bulb element 10 to cause relatively quick opening of the main valve member 23.

The operation of the fuel supply control system is as follows: When the thermostat 8 is satisfied so that the solenoid valve is in closed position preventing flow of fuel to the auxiliary pilot burner 2ª, the main valve will be closed with valve member 23 seated and held in closed position by spring 58 and the pilot valve member 60 will be held in its maximum open position, as shown in Fig. 2. When there is a demand for heat by reason of the thermostat becoming dissatisfied, the thermostat 8 actuates the solenoid valve 7 to open the supply line from inlet chamber 18 for the passage of gas to the auxiliary burner 2ª, the gas being lighted at burner 2ª by the constantly burning pilot 4. The valve 60 being in its maximum or wide open position, a relatively high rate or large quantity of gas will be permitted to flow to the auxiliary burner resulting in a high burner flame which will quickly heat the expansible-contractible fluid in the bulb element 10ª. The time period required to expand chamber 49 sufficiently to move the power element 44 through its maximum travel will depend upon the heat imparted to element 10 and therefore upon the size of the pilot burner flame. As the fluid in bulb element 10 expands on heating, the power element 44 will be compressed, pivoting the bell crank lever 53 in a counterclockwise direction, lifting the arm 55 against the force of the spring 58. Spring 41 acts to move the valve member 23 away from its seat or toward open position as the arm 55 is moved upward. As the valve member 23 moves away from its seat, the spring 72 will move the valve member 60 toward closed position which will decrease the rate at which gas is supplied to the auxiliary burner 2ª. However, metering of gas flow to the auxiliary burner will not occur until the main valve member 23 has moved from its seat sufficiently such that the slot portion 77 of the valve member 60 cooperates with the wall of port or aperture 70. Because of the relatively high temperature to which the expansible-contractible fluid is heated when the valve member 60 is in its maximum open position, the main valve member 23 may upon initial opening movement move to a position such that the valve member 60 will be in closed position with slot portion 77 closed by wall 62 and the metering valve head 68 seated on shoulder 67. The loose connection between valve member 23 and stem 69 will upon such operation, permit the valve member 23 to move away from the stem 69. However, it will be seen that closing of valve member 60 will cause the main valve member 23 to be moved toward closed position due to cooling of bulb element 10 upon extinguishment of the auxiliary burner flame. As the chamber 49 contracts, then after the take-up of any lost-motion between the valve member 23 and stem 69, the valve member 23 will engage stem 69 and under the force of spring 58 will cause the valve member 60 to move away from its seat to again open its port. The valve members 23 and 60 will reciprocate in unison with diminishing periods and extent of reciprocation until a balanced position of the valve members is reached wherein the valve member 60 will be positioned to supply just enough gas to the controlling pilot burner 2ᵃ to keep the valve member 23 in open position for full flow of gas to the main burner 2.

Referring to Fig. 5, the valve casing 12 has its bottom wall provided with an internal partition member 80 which is positioned directly below the valve port 21. This partition member 80 provides a valve chamber or end compartment 81 with an end wall 82 through which there is a gas flow port 83 establishing communication between the intermediate inlet valve chamber 18 and the chamber 81. The lower end of the chamber 81 which is open to the exterior of the casing 12 is closed and sealed by a screw-threaded plug 85. An outlet port 86 from chamber 81 is provided above the plug 85 and is adapted for communication with the conduit 75 leading to the solenoid valve 7. Within chamber 81 there is a valve member 87 of upward tapering, conical form having a valve stem 88 which is reciprocally guided in and extends through the port aperture 83. The conical valve member 87 is cooperable with the downward facing, marginal edge of the port 83 to meter flow of gas from the inlet chamber 18 to the chamber 81. The stem 88 extends upward through and across the inlet chamber 18 into abutting relation with the main valve member 89 corresponding to valve member 23 above described, and seats in a downward facing, conical recess or socket 90 provided in the underface of the valve member 89. Surrounding the partition member 80 which is of upward tapering or converging, external form there is a coil spring 91 of generally helical form but having an upward, longitudinal taper so that it substantially fits the contour of the partition member 80. The spring 91 seats on an external, annular shoulder 92 formed on the outer surface of the partition member 80. The upper or free end of the spring 91 seats against and is positioned laterally by a spring seat member 93 which is secured to the valve stem 88 by means of a cross pin 94.

Figure 6:
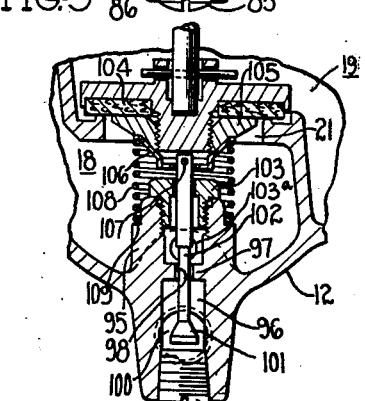
Fig. 6 is a detail view similar to Fig. 5, but showing another modification of my invention.

Referring to Fig. 6, the casing 12 has an internal partition member 95 positioned directly beneath the valve port 21 and of generally tubular form. Within the chamber 96 formed by the tubular partition member 95 there is an annular, internal and transverse flange 97 providing a valve port 98 and downward facing valve seat. The lower end of the partition member 95 which is open to the exterior of the casing 12 is closed and sealed by a plug member 99. Above the plug member 99 there is an outlet port 100 for establishing communication between the chamber 96 and the conduit 75 which leads to the solenoid valve 7. Within the chamber 96 there is a valve member 101 having an upward converging, conical or tapered valve face which is cooperable with the downward facing, inner marginal edge of flange 97 to control and meter flow through the port 98. A valve stem 102 extends upward from the valve member 101 through the port 98 and into the main inlet valve chamber 18. The upper end portion of the partition member 95 is open to the chamber 18 but is internally screw-threaded to receive an apertured guide and centering member 103 which is screw-threaded into the partition member 95. The aperture in member 103 serves as an inlet passageway for flow of gas to the chamber 96. However, under some conditions it is desired to have the chamber 96 fed from the source of gas supply on the inlet side of the usual pressure regulating valve (not shown), and therefore there is provided a passageway 103ᵃ leading through a boss in chamber 18 and through the wall of casing 12 to the inlet side of port 98. This passageway 103ᵃ is of course plugged or closed if the feed to port 98 is to be through the member 103. However, when passageway 103ᵃ is used, the high pressure gas feeding into chamber 18 through member 103 is immaterial in commercial operation and is controlled by the main valve 104. The stem 102 extends through and is guided in the aperture in member 103 and extends into the chamber 18 into substantially abutting engagement with the underface of the main valve member 104 which corresponds with the heretofore described valve members 23 and 89. The valve member 104 has a washer clamping nut 105 with a downward facing conical or converging underface to receive a spring seat and valve supporting member 106 which is of cup-like form having an upward diverging or flaring side wall conforming to and fitting the downward facing taper of the clamping nut 105. The member 106 surrounds the stem 102 and has its bottom wall apertured such that the stem passes thereinto and is secured therein and thereto by a cross pin 107. Interposed between the partition member 95 and the seat member 106 there is a helical coil spring 108 which is locked at its lower end by the tubular partition member 95 seating on an upward facing shoulder 109 provided externally thereon. The upper end of the spring 108 urges the seat member 106 into engagement with the valve member 104 so that on upward movement of the valve member 104 the valve member 101 will follow therewith and so that the valve member 101 will move in accordance with the movement of the main valve member 104.

The operation of the control devices shown in Figs. 5 and 6, it is believed, will be obvious from the description given above with respect to the control device of Figs. 1 to 4 inclusive. However, it may be noted, when the thermostat 8 is satisfied upon the occurrence of the desired temperature thereat, that the solenoid valve 7 will be deenergized and closed, thereby stopping flow of gas to the controlling pilot burner 2ᵃ. Since the bulb element 10 was heated by burner 2ᵃ only sufficiently to hold the main valve in each embodiment in open position or just slightly above the temperature which would permit closing of the main valve by the spring 58, it will be apparent that the main valve will start to close from full flow position almost instantly upon closure of the solenoid valve and immediately upon initial cooling of the bulb element 10, that is, there is no lost motion or valve movement to bring the main valve to a throttling position. Closure of the main valve in each embodiment of course positions the pilot metering valve of each embodiment in its wide open position for start of another cycle of operation as above described upon the next call for heat by the thermostat 8.

This application is a continuation in part for my copending application Serial No. 41,975, filed September 25, 1935, for Fuel supply control systems.

What I claim and desire to secure by Letters Patent of the United States is:

1. A control device, comprising valve casing having an internal partition with a valve port therethrough and having an inlet and an outlet on opposite sides of said partition, a housing member supported on said casing and including a bonnet member closing said casing, a normally closed valve member controlling flow through said port and operable to seat on said partition, a stem on said valve member and extending through said bonnet member into said housing member, temperature responsive actuating means carried by said housing member and acting on said valve stem to hold said valve member closed at predetermined low temperature, a hollow casing portion integral with a wall of said casing and alined with said port, said portion having an outlet and having an aperture therethrough establishing communication directly from said inlet to the interior of said portion, said portion also having an internal valve port, a normally open valve in said portion and having a conical portion cooperable with said last-named port to stop flow of fluid from said inlet to the interior of said portion, a stem for said valve having a metering portion cooperable with and extending through said aperture to modulate flow of fluid therethrough and operable to engage said closed valve member to thereby maintain said normally open valve in open position when said valve member is in position against its seat, and a spring acting on said normally open valve and urging said normally open valve toward said valve member and said last-named port.

2. A control device for fluid fuel burners, comprising a hollow casing, a pair of partition members dividing said casing internally into an intermediate compartment and two end compartments, said end compartments being one on each side of said intermediate compartment, each of said partition members having an aperture establishing communication for fluid flow from said intermediate compartment to the adjacent end compartments, said apertures being alined, a normally closed main valve member in one end compartment and controlling flow from said intermediate compartment through one of said apertures to a main burner, a normally open metering pilot valve separate from said main valve member and positioned in the other end compartment and controlling flow through the other of said apertures and from said intermediate compartment to said other end compartment, thrust means extending through said intermediate compartment and normally interconnecting said valve members for movement in unison, a spring acting to move said open pilot valve member toward closed position and toward said closed main valve member, said pilot valve member having limited movement toward said main valve member so that said main valve member may have movement subsequent to limitation of movement of said pilot valve member, said pilot valve member being held in open position when said main valve member is in closed position by engagement of said thrust means with said main valve member, and means for operating said closed main valve member and opposing said spring.

3. A control device, comprising a valve casing having an inlet and an outlet, a partition member in said casing with an aperture therethrough providing a valve port, said casing having alined openings through its opposite walls, said openings being alined with said aperture, a main valve member insertable through one of said openings and operable to control flow through said aperture, a bonnet member on said casing and having a guideway therethrough, a stem on said valve member and reciprocal in and extending through said guideway, a metering valve member cooperable with the other of said openings, a stem on said metering member extending through and guided in said other opening, said metering member stem extending into engagement with said main valve member and being of sufficient length to hold said metering member open when said main valve member is closed, means for flow of fluid through the guide opening for said metering member stem, said other opening being of reduced area relative to said aperture so that said metering valve member may have relatively great movement and still accurately modulate a flow of fluid which is small relative to fluid flow through said aperture, and a spring acting on and tending to close said metering valve member and acting to hold said metering member stem in engagement with said main valve member.

4. A control device, comprising a valve casing having an internal partition with a valve port therethrough and having an inlet and an outlet on opposite sides of said partition, said casing having an opening alined with said port, a bonnet member closing said opening and having a guideway therethrough alined with said port, a housing supported on said casing and secured to said bonnet member, a valve member positioned on the outlet side of said partition and controlling said port, a stem extending from said valve member and projecting through said guideway into said housing, automatically operable means in said housing and acting on said stem to operate said valve member, a second partition cooperable with said casing to provide a valve chamber and having an aperture alined with said port, valve means in said chamber and having a stem extending through said aperture toward said valve member for movement thereby to control normal flow through said chamber, said aperture being of greatly reduced diameter relative to said valve port so that a relatively small flow of fluid with respect to the flow through said valve port may be accurately modulated to maintain the desired fluid flow through said aperture, said stem being operable when said valve member is in closed position to engage said valve member to hold said valve means in open position, and a spring acting on said valve means and opposing movement thereof by said valve member.

5. A control device for fluid fuel burners, comprising a hollow casing, a pair of partition members dividing said casing internally into an intermediate compartment and two end compartments, said end compartments being one on each side of said intermediate compartment, each of said partition members having an aperture establishing communication for fluid flow from said intermediate compartment to the adjacent end compartments, said apertures being alined, a normally closed main valve member in one end compartment and controlling flow from said intermediate compartment through one of said apertures to a main burner, a normally open modulating pilot valve in the other end compartment and controlling flow from said intermediate compartment to said other end compartment, thrust means extending through said intermediate compartment and interconnecting said valve members for movement in unison, a substantially helical coil spring positioned in said intermediate compartment and surrounding said thrust means, a spring seat member on said stem and operable to transmit the force of said spring to said stem to urge said open pilot valve member toward closed position and toward said closed main valve member, and means sensitive to the flow through said modulating pilot valve for operating said closed main valve member and opposing said spring.

6. A control device for fluid fuel burners, comprising a hollow casing having a partition therein separating said casing internally into an inlet chamber and an outlet chamber, said partition having an opening therethrough providing a valve port, a valve member in said casing controlling flow through said port, a tubular partition member extending into said inlet chamber and alined with said port, modulating valve means within said partition member and controlling flow therethrough from said inlet chamber, a stem on said valve means and extending into operative engagement with said valve member, a substantially helical coil spring surrounding said partition member and extending therebeyond toward said valve member, a spring seat member secured to said valve stem and receiving one end of said spring, and means sensitive to the flow through said valve means and operable through said valve member to move said valve means.

7. A control device for fluid fuel burners, comprising a hollow casing having a partition therein separating said casing internally into an inlet chamber and an outlet chamber, said partition having an opening therethrough providing a valve port, a valve member in said casing controlling flow through said port, a tubular partition member extending into said inlet chamber and alined with said port, metering valve means within said partition member and controlling flow therethrough from said inlet chamber, a stem on said valve means and extending into operative engagement with said valve member, a substantially helical coil spring surrounding said partition member and extending therebeyond toward said valve member, said tubular member having a shoulder receiving one end of said spring, said valve member having a downward converging underface, a spring seat member conforming to said underface and secured to said valve stem and receiving the other end of said spring, and means sensitive to the flow through said metering valve means and operable through said valve member to move said valve means.

8. A control device for fluid fuel burners, comprising a hollow casing having a partition therein separating said casing internally into an inlet chamber and an outlet chamber, said partition having an opening therethrough providing a valve port, a valve member in said casing controlling flow through said port, a tubular partition member extending into said inlet chamber and alined with said port, an apertured guide member within said inlet chamber and secured to said tubular member, an annular flange within said tubular member and providing a valve port, a metering valve within said tubular member and cooperable with said last-named port, a stem on said metering valve and extending through said last-named port and said guide member, said tubular member having a circumferential shoulder facing said valve member, a cup-like spring seat member surrounding and secured to said stem and having a flaring side wall, said valve member having a downward converging underface receiving said flaring side wall, a helical coil spring positioned and held under compression between said shoulder and said seat member, and means sensitive to the flow through said metering valve and operable through said valve member to move said metering valve in opposition to the force of said spring.

9. A control device for fluid fuel burners, comprising a hollow casing having a partition therein separating said casing internally into an inlet chamber and an outlet chamber, said partition having an opening therethrough providing a valve port, a valve member in said casing controlling flow through said port, a tubular partition member extending into said inlet chamber and alined with said port, metering valve means within said partition member and controlling flow therethrough from said inlet chamber, said partition member having a passageway extending thereinto on the inlet side of said valve means from the exterior of said casing so that the interior of said partition member can be supplied with fuel either from said inlet chamber or directly from the exterior of said casing, a stem on said valve means and extending into operative engagement with said valve member, a substantially helical coil spring surrounding said partition member and extending therebeyond toward said valve member, a spring seat member secured to said valve stem and receiving one end of said spring, and means sensitive to the fluid flow through said valve means and operable through said valve member to move said valve means.

EARNEST J. DILLMAN.